United States Patent
Kachmar et al.

(10) Patent No.: US 8,388,242 B2
(45) Date of Patent: Mar. 5, 2013

(54) IN-LINE SPLICE WITH INTEGRATED SPLICE HOLDER

(75) Inventors: Wayne M. Kachmar, North Bennington, VT (US); Ronald J. Kleckowski, Manchester Center, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 12 days.

(21) Appl. No.: 13/111,578

(22) Filed: May 19, 2011

(65) Prior Publication Data

US 2011/0311185 A1 Dec. 22, 2011

Related U.S. Application Data

(60) Provisional application No. 61/394,226, filed on Oct. 18, 2010, provisional application No. 61/346,355, filed on May 19, 2010.

(51) Int. Cl.
*G02B 6/255* (2006.01)

(52) U.S. Cl. ............. 385/95; 385/53; 385/54; 385/78; 385/96; 385/97; 385/98; 385/99; 385/100; 385/101; 385/102; 385/103; 385/104; 385/105; 385/106; 385/107; 385/108; 385/109; 385/110; 385/111; 385/112; 385/113; 385/114

(58) Field of Classification Search ............. 385/53–54, 385/78, 95–99, 100–114
See application file for complete search history.

(56) References Cited

U.S. PATENT DOCUMENTS

| | | | |
|---|---|---|---|
| 4,580,874 A * | 4/1986 | Winter et al. | ............ 385/99 |
| 4,964,688 A | 10/1990 | Caldwell et al. | |
| 5,481,634 A | 1/1996 | Anderson et al. | |
| 5,720,907 A | 2/1998 | Anderson et al. | |
| 5,748,819 A | 5/1998 | Szentesi et al. | |
| 6,542,674 B1 | 4/2003 | Gimblet | |
| 6,848,837 B2 | 2/2005 | Gilligan | |
| 6,918,703 B2 | 7/2005 | Chen et al. | |
| 7,104,702 B2 | 9/2006 | Barnes et al. | |
| 7,280,733 B2 * | 10/2007 | Larson et al. | ............ 385/139 |
| 7,369,738 B2 * | 5/2008 | Larson et al. | ............ 385/134 |
| 7,507,031 B2 | 3/2009 | Kawasaki | |
| 7,594,764 B2 | 9/2009 | Palmer et al. | |
| 7,637,673 B2 | 12/2009 | Oike et al. | |
| 7,775,726 B2 | 8/2010 | Pepin et al. | |
| 7,860,363 B2 | 12/2010 | Kawasaki | |
| 7,934,874 B2 | 5/2011 | Honma et al. | |

(Continued)

OTHER PUBLICATIONS

International Search Report and Written Opinion mailed Feb. 9, 2012.

(Continued)

*Primary Examiner* — Brian Healy
*Assistant Examiner* — Guy Anderson
(74) *Attorney, Agent, or Firm* — Merchant & Gould P.C.

(57) ABSTRACT

A fiber optic cable assembly includes a connector and a fiber optic cable. The connector includes a housing having a first axial end and an oppositely disposed second axial end. A ferrule is disposed in the housing. A plurality of optical fibers is mounted in the ferrule. The fiber optic cable includes an outer jacket defining a fiber passage that extends longitudinally through the outer jacket and a window that extends through the outer jacket and the fiber passage. First and second strength members are oppositely disposed about the fiber passage in the outer jacket. A plurality of optical fibers is disposed in the fiber passage. The optical fibers are joined at splices to the optical fibers of the connector. A splice sleeve is disposed over the splices. The splice sleeve is disposed in the window of the outer jacket.

21 Claims, 16 Drawing Sheets

U.S. PATENT DOCUMENTS

| | | |
|---|---|---|
| 8,041,166 B2 | 10/2011 | Kachmar |
| 8,043,013 B2 | 10/2011 | Lichoulas et al. |
| 2003/0026562 A1 | 2/2003 | Takahashi |
| 2004/0042733 A1 | 3/2004 | Kang et al. |
| 2005/0036744 A1 | 2/2005 | Caveney et al. |
| 2005/0238292 A1 | 10/2005 | Barnes et al. |
| 2007/0036487 A1 | 2/2007 | Grzegorzewska et al. |
| 2007/0104425 A1* | 5/2007 | Larson et al. ............. 385/86 |
| 2008/0279511 A1 | 11/2008 | Kawasaki et al. |
| 2009/0162019 A1 | 6/2009 | Lichoulas et al. |
| 2009/0269014 A1 | 10/2009 | Winberg et al. |
| 2010/0086266 A1 | 4/2010 | Marcouiller et al. |
| 2011/0044588 A1* | 2/2011 | Larson et al. ............. 385/81 |

OTHER PUBLICATIONS

Lynx2 Customfit MPO Splice-on Connector, http://www.sumitomoelectric.com/products/fusionsplicers/lynx_mpo/, 2 pages (Copyright 2011) Date Printed Jun. 2, 2011.

S153 Fusion Splicers Hand-Held Active Alignment Fusion Splicer, OFS Fitel, LLC, 4 pages (Copyright 2010).

Splice-on-Connector, http://www.seikoh-giken.co.jp/en/products/soc.html, 2 pages (Copyright 2000-2011) Date Printed Jun. 13, 2011.

* cited by examiner

IN-LINE SPLICE WITH INTEGRATED SPLICE HOLDER

CROSS-REFERENCE TO RELATED APPLICATIONS

This application claims the benefit of U.S. Provisional Patent Application Ser. No. 61/394,226, filed Oct. 18, 2010 and U.S. Provisional Patent Application Ser. No. 61/346,355, filed May 19, 2010, which applications are hereby incorporated by reference in their entireties.

BACKGROUND

Drop cables used in fiber optic networks can be constructed having a jacket with a flat transverse profile. Such cables typically include a central buffer tube containing a plurality of optical fibers, and reinforcing members such as rods made of glass reinforced epoxy embedded in the jacket on opposite sides of the buffer tube. U.S. Pat. No. 6,542,674 discloses a drop cable of a type described above. Drop cables of this type as well as other fiber optic cables can be difficult or expensive to connectorize. Improvements in this area are needed.

SUMMARY

An aspect of the present disclosure relates to a fiber optic cable assembly. The fiber optic cable assembly includes a multi-fiber connector and a fiber optic cable. The multi-fiber connector includes a housing having a first axial end and an oppositely disposed second axial end. A ferrule is disposed in the housing. Each of a plurality of optical fibers includes a first end mounted in the ferrule and an oppositely disposed second end that extends outwardly from the second axial end of the housing. The fiber optic cable includes an outer jacket defining a fiber passage that extends longitudinally through the outer jacket and a window that extends through the outer jacket and the fiber passage. First and second strength members are oppositely disposed about the fiber passage in the outer jacket. A plurality of optical fibers is disposed in the fiber passage. The optical fibers are joined at splices to the optical fibers of the multi-fiber connector. A splice sleeve is disposed over the splices between the optical fibers of the fiber optic cable and the optical fibers of the multi-fiber connector. The splice sleeve is disposed in the window of the outer jacket. A boot is disposed over the second axial end of the housing and the window of the outer jacket.

Another aspect of the present disclosure relates to a method for splicing optical fibers of a fiber optic cable. The method includes stripping a portion of an outer jacket from an end of a fiber optic cable so that first and second strength members are exposed. A slit is cut into the end of the fiber optic cable. The slit extends through an outer surface of the outer jacket and through a fiber passage defined by the fiber optic cable. The slit forms first and second portions of the end of the fiber optic cable. The first and second portions of the fiber optic cable are separated to expose a first plurality of optical fibers disposed in the fiber passage. The first plurality of optical fibers of the fiber optic cable is joined to a second plurality of optical fibers at splices. A window is cut in the outer jacket of the fiber optic cable. The window is disposed between the first and second strength members. The first portion is positioned adjacent to the second portion so that the splices are disposed in the window. A boot is installed over the window.

Another aspect of the present disclosure relates to a method of terminating a fiber optic cable with a multi-fiber connector. The method includes stripping a portion of an outer jacket from an end of a fiber optic cable so that first and second strength members are exposed. A slit is cut into the end of the fiber optic cable. The slit extends through an outer surface of the outer jacket and through a fiber passage defined by the fiber optic cable. The slit forms first and second portions of the end of the fiber optic cable. The first and second portions of the fiber optic cable are separated to expose a first plurality of optical fibers disposed in the fiber passage. The first plurality of optical fibers of the fiber optic cable is joined to a second plurality of optical fibers of a multi-fiber connector at splices. A splice sleeve is installed over the splices. A window is cut in the outer jacket of the fiber optic cable. The window is disposed between the first and second strength members. The first portion is positioned adjacent to the second portion so that the splice sleeve is disposed in the window. The first and second strength members are secured in a housing of the multi-fiber connector. A boot is installed over an axial end of the housing of the multi-fiber connector and the window of the fiber optic cable.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
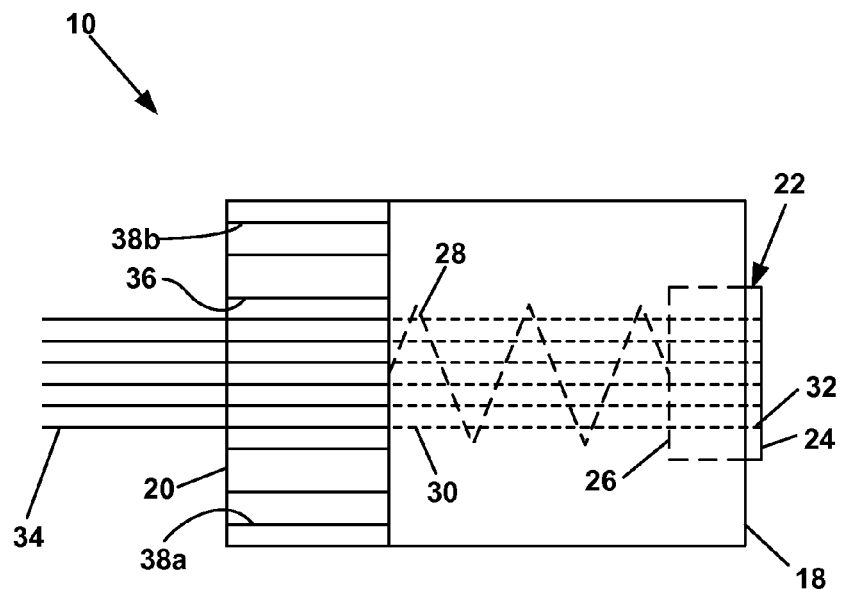
FIGS. 1 and 2 are exemplary schematic representations of a multi-fiber connector.
Figure 2:
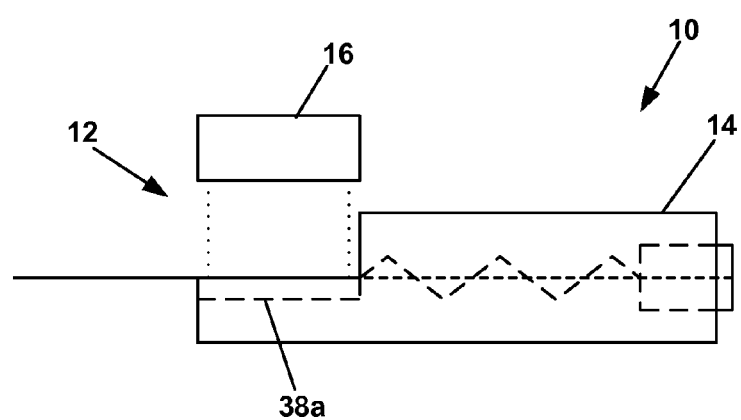

Referring now to FIGS. 1 and 2, a schematic representation of a multi-fiber connector 10 is shown. The multi-fiber connector 10 includes a housing 12 having a base 14 and a cover 16. The housing 12 includes a first axial end 18 and an oppositely disposed second axial end 20. The housing 12 includes a ferrule 22 having a first end 24 and an oppositely disposed second end 26. The ferrule 22 is disposed in the housing 12 so that the first end 24 of the ferrule 22 extends outwardly from the first axial end 18 of the housing 12. In the depicted embodiment, the ferrule 22 is adapted to slide axially in the housing 12. A spring 28 acts against the second end 26 of the ferrule 22 to bias the ferrule 22 so that the first end 24 extends outwardly from the first axial end 18 of the housing 12.

The ferrule 22 includes a plurality of optical fibers 30. In the subject embodiment, the optical fibers 30 are disposed in a ribbon configuration. The optical fibers 30 are mounted in the ferrule 22 so that first ends 32 of the optical fibers 30 are generally flush with the first end 24 of the ferrule 22. With the ferrule 22 disposed in the housing 12, second ends 34 of the optical fibers 30 extend outwardly from the second axial end 20 of the housing 12.

The base 14 of the housing 12 defines a central groove 36 in which the optical fibers 30 are disposed. The base 14 further defines first and second grooves 38a, 38b disposed on opposite sides of the central groove 36. The first and second grooves 38a, 38b are adapted to receive strength members of a fiber optic cable. With strength members of a fiber optic cable disposed in the first and second grooves 38a, 38b, the cover 16 is fastened (e.g., screwed, glued, etc.) to the base 14.

Figure 3:
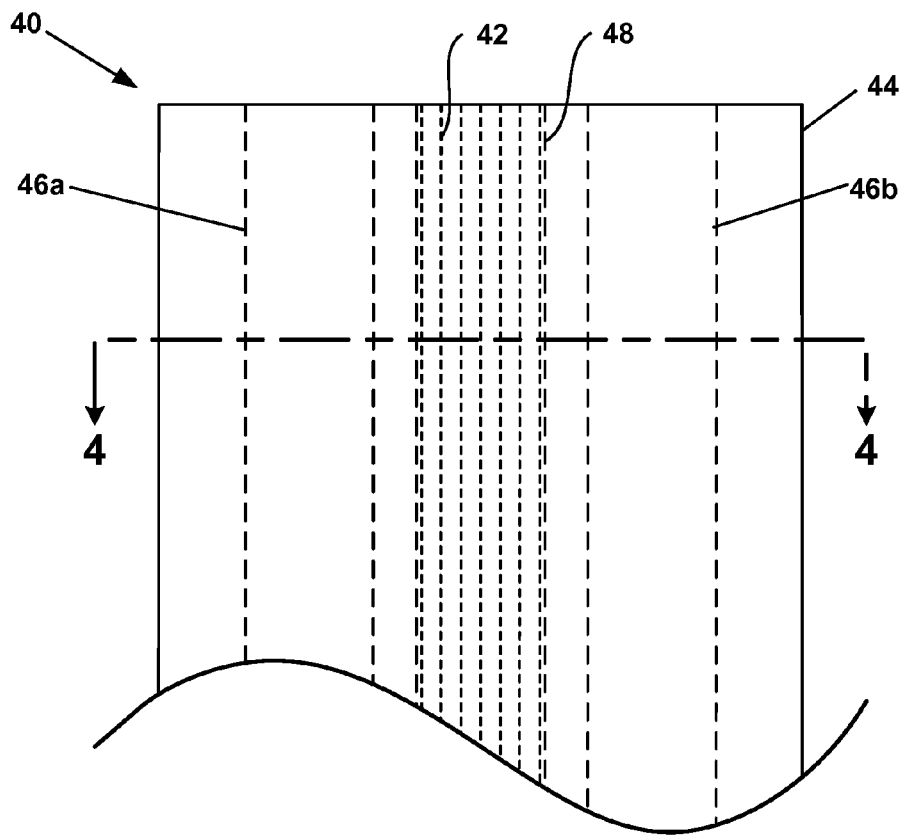
FIG. 3 is an exemplary schematic representation of a fiber optic cable.
Figure 4:
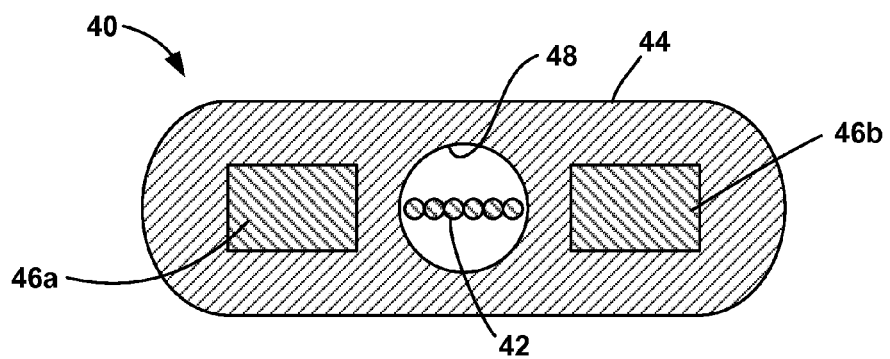
FIG. 4 is an exemplary cross-sectional view of the fiber optic cable taken on line 4-4 of FIG. 3.

Referring now to FIGS. 3 and 4, a schematic representation of a fiber optic cable 40 is shown. The fiber optic cable 40 includes a plurality of optical fibers 42, an outer jacket 44 and a plurality of strength members 46.

Each of the optical fibers 42 of the fiber optic cable 40 includes a core surrounded by a cladding and a coating. The core is made of a glass material, such as a silica-based material, having a first index of refraction. In the subject embodiment, the core has an outer diameter of less than or equal to about 10 μm.

The cladding defines a second index of refraction that is less than the first index of refraction defined by the core. This difference between the first index of refraction of the core and the second index of refraction of the cladding allows an optical signal that is transmitted through the optical fiber 42 to be confined to the core. In the subject embodiment, the cladding has an outer diameter of less than or equal to about 125 μm.

The coating surrounds the cladding of the optical fiber 42. The coating includes an inner layer and an outer layer. In the subject embodiment, the inner layer of the coating is immediately adjacent to the cladding such that the inner layer surrounds the cladding. The inner layer is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer functions to protect the optical fiber 42 from microbending.

The outer layer of the coating is a polymeric material having a higher modulus of elasticity than the inner layer. In the subject embodiment, the outer layer of the coating is immediately adjacent to the inner layer such that the outer layer surrounds the inner layer. The higher modulus of elasticity of the outer layer functions to mechanically protect and retain the shape of optical fiber 42 during handling. In the subject embodiment, the outer layer defines an outer diameter of less than or equal to about 250 μm. In another embodiment, the outer diameter of the outer layer is in the range of about 242 μm to about 245 μm.

The outer jacket 44 surrounds the optical fibers 42. In the depicted embodiment, the outer jacket 44 has an elongated transverse cross-sectional profile. The outer jacket 44 has a width W and a thickness T. In the subject embodiment, the width W of the outer jacket 44 is greater than the thickness T. The greater width W than thickness T of the outer jacket 44 gives the fiber optic cable 40 its generally flat cable appearance.

In the subject embodiment, the outer jacket 44 of the fiber optic cable 40 includes a polymer material such as a flexible chain polymer. Example polymer materials suitable for use for the outer jacket 44 include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. The base material can also include combinations of the above materials as well as combinations of other materials.

The outer jacket 44 defines a fiber passage 48. In the depicted embodiment, the fiber passage 48 is centrally disposed in the outer jacket 44 and extends the length of the fiber optic cable 40. The fiber passage 48 is generally circular in shape. The optical fibers 42 are disposed in the fiber passage 48. In the depicted embodiment, the fiber passage 48 is tubeless. It will be understood that the term "tubeless" refers to a fiber passage 48 without a buffer tube. In the depicted embodiment, the optical fibers 42 are positioned directly within the fiber passage 48 of the outer jacket 44 without any intermediate buffer tubes. In this manner, the portion of the outer jacket 44 defining the fiber passage 48 functions as a buffer tube for containing the optical fibers 42.

In the depicted embodiment, the strength members 46 of the fiber optic cable 40 include a first strength member 46a and a second strength member 46b. The first and second strength members 46a, 46b are bonded to the outer jacket 44 of the fiber optic cable 40. The bonding between the first and second strength members 46a, 46b and the outer jacket 44 can be chemical bonding or thermal bonding. In one embodiment, the first and second strength members 46a, 46b may be coated with or otherwise provided with a material having bonding characteristics (e.g., ethylene acetate) to bond the first and second strength members 46a, 46b to the outer jacket 44. The first and second strength members 46a, 46b are symmetrically disposed about the fiber passage 48 so that the first strength member 46a is disposed on a first side of the fiber passage 48 and the second strength member 46b is disposed on a second side of the fiber passage 48. In the depicted embodiment, the second strength member 46b is disposed about 180 degrees about the fiber passage 48 from the first strength member 46a.

In one embodiment, each of the first and second strength members 46a, 46b has a construction that is highly flexible and highly strong in tension. An exemplary strength member suitable for use as the first and second strength members 46a, 46b has been described in U.S. patent application Ser. No. 12/607,748, entitle "Flat Drop Cable" and filed on Oct. 28, 2009, now U.S. Pat. No. 8,041,166 issued Oct. 18, 2011, the disclosure of which is hereby incorporated by reference in its entirety.

In certain embodiments, each of the first and second strength members 46a, 46b is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In another embodiment, each of the first and second strength members 46a, 46b has a construction that is rigid so as to provide anti-buckling reinforcement and strong in tension. An exemplary strength member suitable for use as the first and second strength members 46a, 46b is described in U.S. Pat. No. 6,542,674, the disclosure of which is hereby incorporated by reference in its entirety.

Referring now to FIGS. 1, 2 and 5-13, a method 200 for splicing the fiber optic cable 40 will be described. While the method 200 will be described with regard to the multi-fiber connector 10, it will be understood that the method 200 could also be applied when splicing two similar or dissimilar fiber optic cables together.

In step 202, the ferrule 24 of the multi-fiber connector 10 is prepared. In one embodiment, the optical fibers 30 are mounted in the ferrule 22 and the first end 24 of the ferrule 22 is polished.

Figure 5:
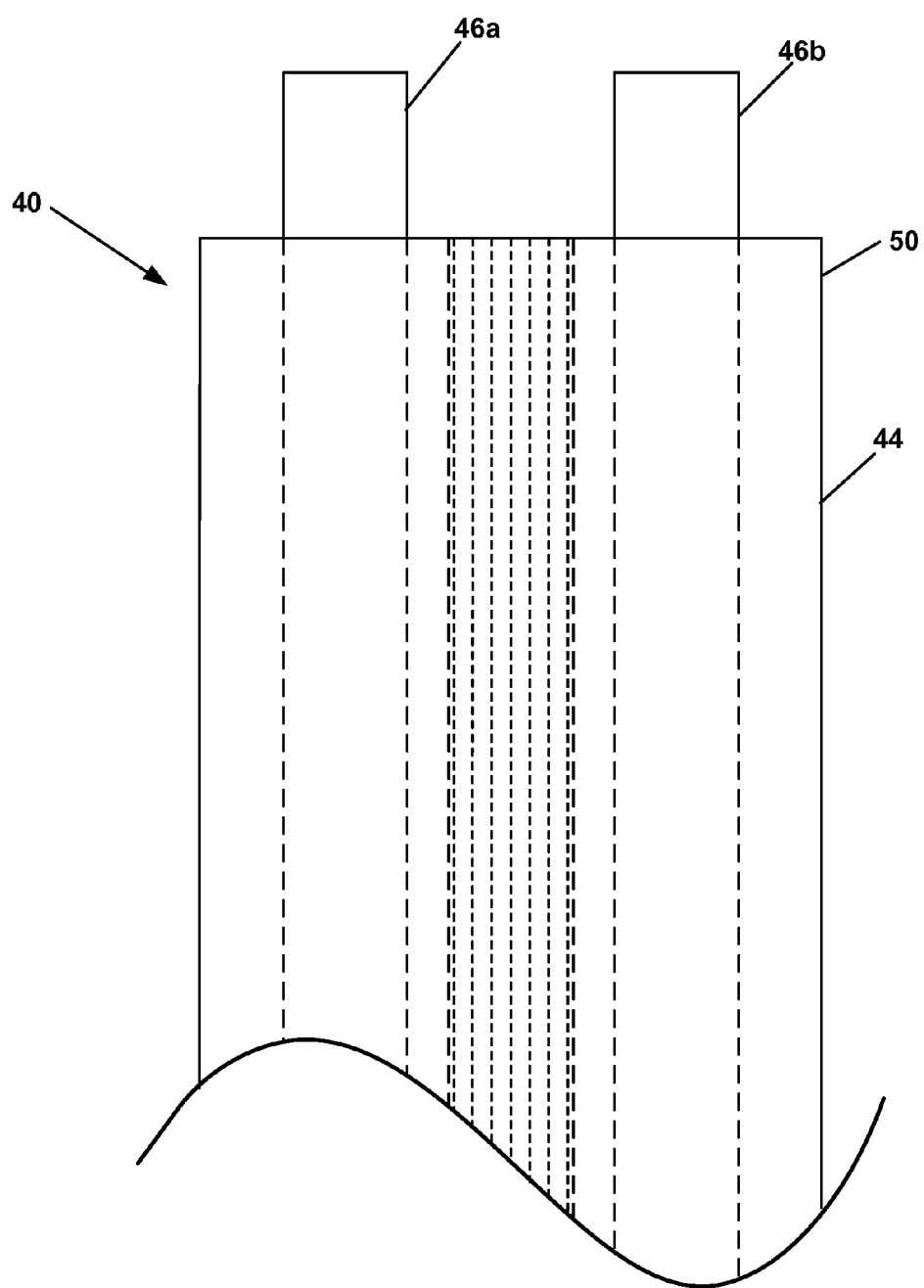
FIG. 5 is an exemplary representation of the fiber optic cable of FIG. 3 with a portion of an outer jacket removed.
Figure 13:
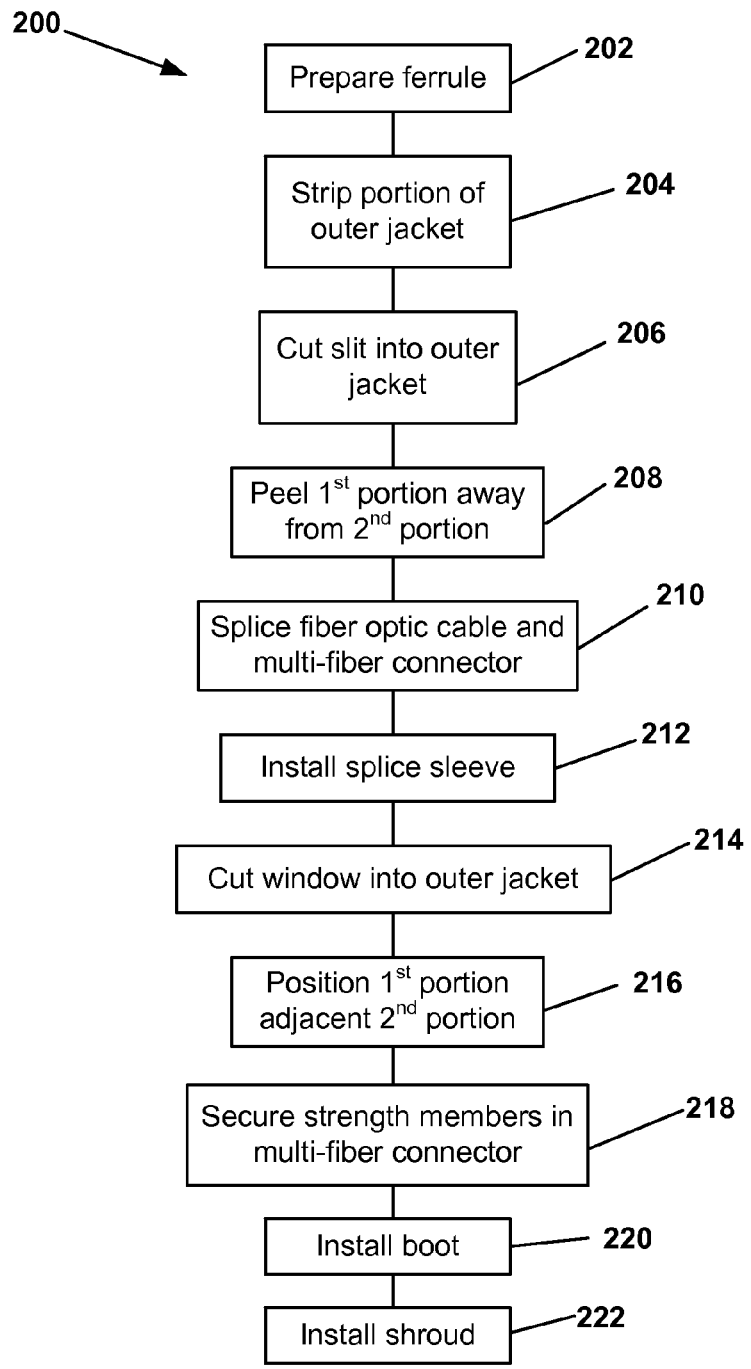
FIG. 13 is a representation of a method for splicing optical fibers of a fiber optic cable.

Referring now to FIGS. 5 and 13, a portion of the outer jacket 44 of the fiber optic cable 40 is removed or stripped from an end 50 of the fiber optic cable 40 in step 204. With the portion of the outer jacket 44 removed from the end 50, the first and second strength members 46a, 46b are exposed.

Figure 6:
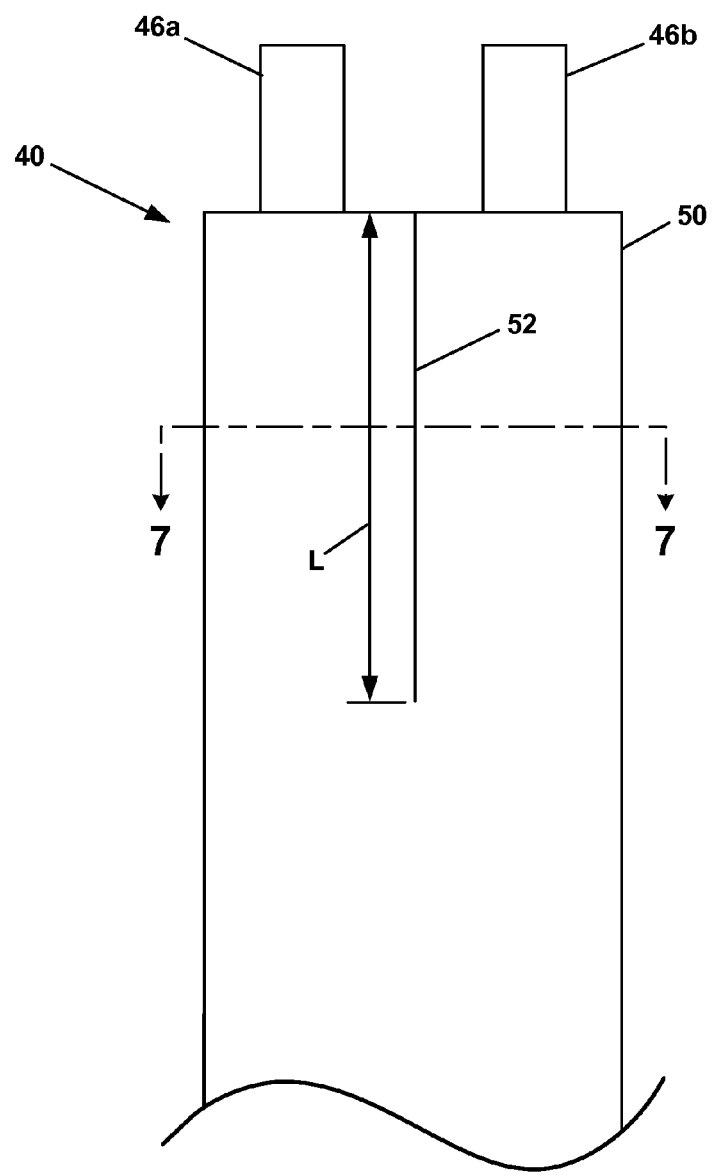
FIG. 6 is an exemplary representation of a fiber optic cable having a slit.
Figure 7:
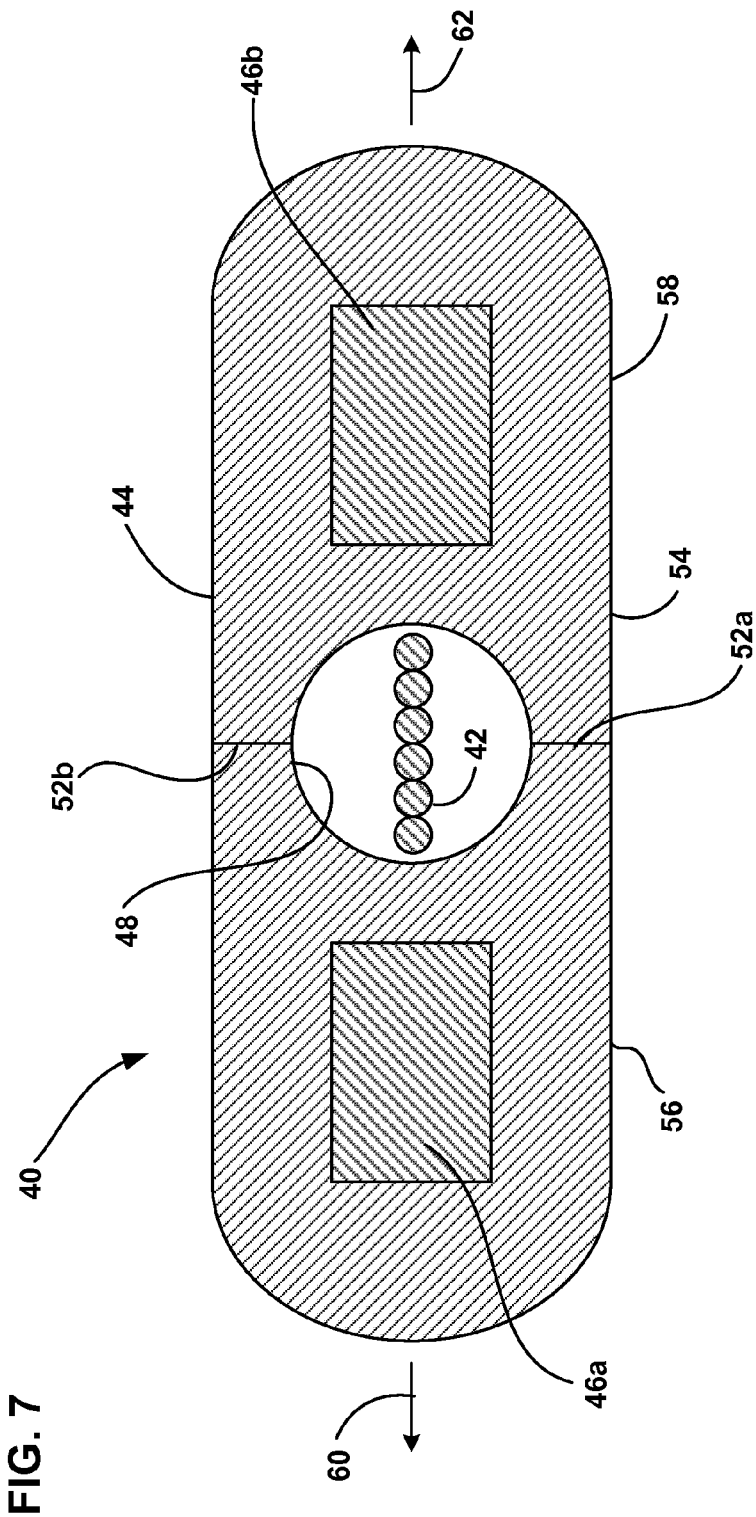
FIG. 7 is an exemplary cross-sectional view of the fiber optic cable taken on line 7-7 of FIG. 6.

Referring now to FIGS. 6, 7 and 13, a slit 52 is made in the outer jacket 44 of the fiber optic cable 40 in step 206. The slit 52 extends longitudinally along the fiber optic cable 40 for a given length L. The slit 52 extends radially inward so that the slit 52 passes through an outer surface 54 of the outer jacket 44 and through the fiber passage 48. In the subject embodiment, the slit 52 is disposed between the first and second strength members 46a, 46b. In the depicted embodiment of FIG. 7, there is a first slit 52a and a second slit 52b disposed about the fiber passage 48. The first and second slits 52a, 52b are about 180 degrees apart.

Figure 8:
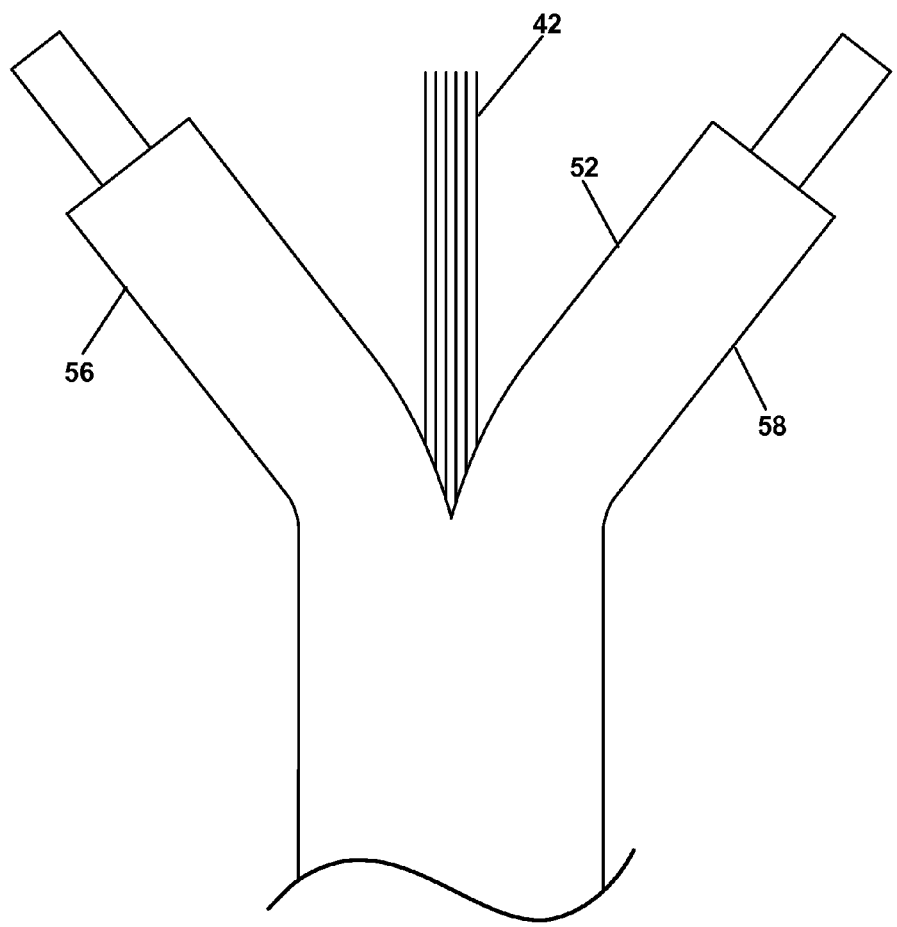
FIG. 8 is an exemplary representation of a fiber optic cable with optical fibers exposed.

Referring now to FIGS. 7, 8 and 13, the first and second slits 52a, 52b divide the end 50 of the fiber optic cable 40 into a first portion 56 and a second portion 58. In the depicted embodiment of FIGS. 7 and 8, the first portion 56 includes the first strength member 46a and the second portion 58 includes the second strength member 46b. In step 208, the first portion 56 of the fiber optic cable 40 is peeled away from the second portion 58. In the depicted embodiment of FIGS. 7 and 8, the first portion 56 is pulled in a first direction 60 while the second portion 58 is pulled in a second direction 62, which is opposite the first direction 60. With the first and second portions 56, 58 pulled in the first and second directions 60, 62, respectively, a portion of the optical fibers 42 that are disposed in the fiber passage 48 is exposed.

Figure 9:
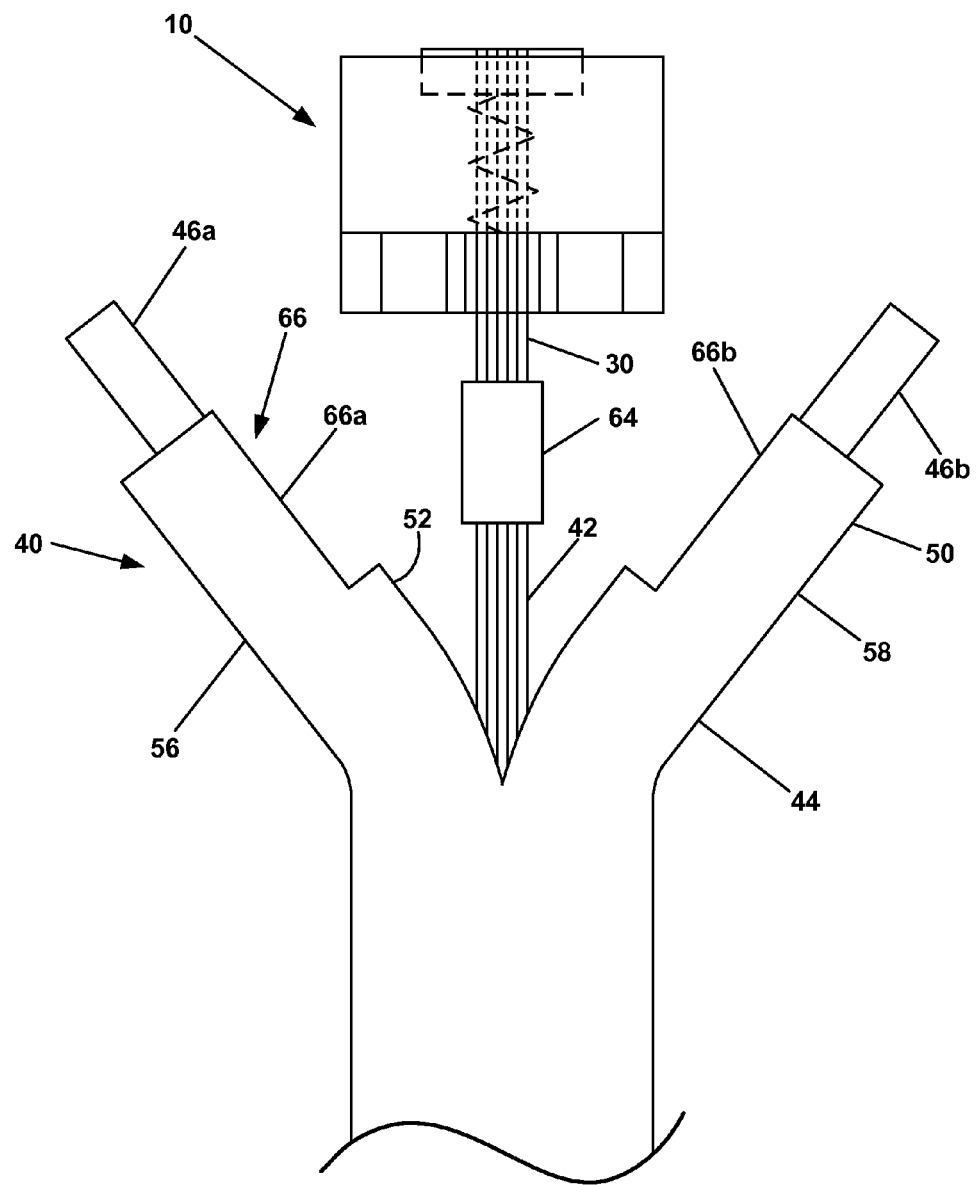
FIG. 9 is an exemplary representation of a fiber optic cable spliced to a multi-fiber connector.

Referring now to FIGS. 9 and 13, with the portion of the optical fibers 42 of the fiber optic cable 40 exposed, the multi-fiber connector 10 is spliced to the fiber optic cable 40 in step 210. In one embodiment, the optical fibers 30 of the multi-fiber connector 10 are fusion spliced to the optical fibers 42 of the fiber optic cable 40. In fusion splicing, the ends of the optical fibers to be spliced are stripped so that the protective coatings are removed from the optical fibers. The ends of the optical fibers 30 of the multi-fiber connector 10 and the ends of the optical fibers 42 of the fiber optic cable 40 are then aligned and fused together using heat. In another embodiment, the optical fibers 30 of the multi-fiber connector 10 and the optical fibers 42 of the fiber optic cable 40 are spliced and recoated.

In step 212, a splice sleeve 64 is installed over the splices between the optical fibers 30 of the multi-fiber connector 10 and the optical fibers 42 of the fiber optic cable 40. In one embodiment, the splice sleeve 64 is heated to shrink the splice sleeve around the splices. If the splices between the optical fibers 30 of the multi-fiber connector 10 and the optical fibers 42 of the fiber optic cable 40 have been recoated, the splice sleeve 64 may not be used.

As the splice sleeve 64 has an outer diameter that is greater than the inner diameter of the fiber passage 48, a window 66 is cut into the outer jacket 44 in step 214. The window 66 is a space that is disposed between the first and second strength members 46a, 46b and is adapted to receive the splice sleeve 64. In the depicted embodiment, the window 66 bifurcates the end 50 of the fiber optic cable 40.

In one embodiment, the window 66 is defined by a first recess 66a and a second recess 66b. With the first portion 56 of the fiber optic cable 40 peeled away from the second portion 58, the first recess 66a is cut into the first portion 56 of the outer jacket 44 and the second recess 66b is cut into the second portion 58 of the outer jacket 44.

In the depicted embodiment, the first recess 66a extends into the outer jacket 44 in a direction from the first and second slits 52a, 52b to the first strength member 46a. The second recess 66b extends into the outer jacket 44 in a direction from the first and second slits 52a, 52b to the second strength member 46b.

Figure 10:
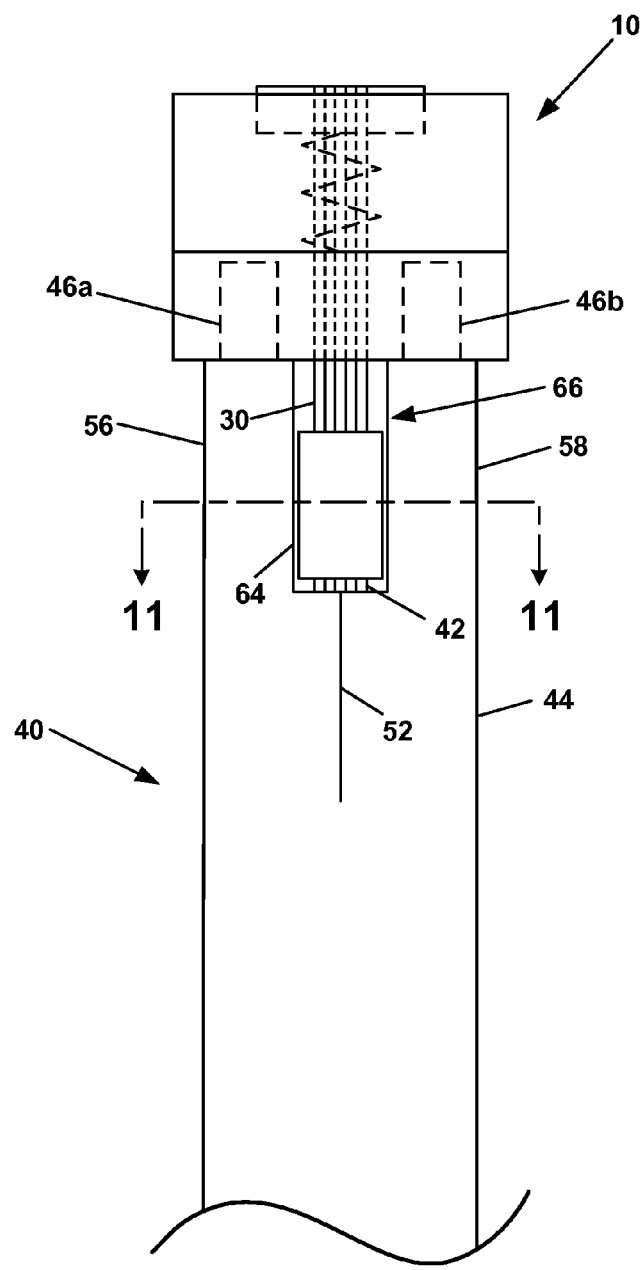
FIG. 10 is an exemplary representation of a splice sleeve disposed in a window of a fiber optic cable.
Figure 11:
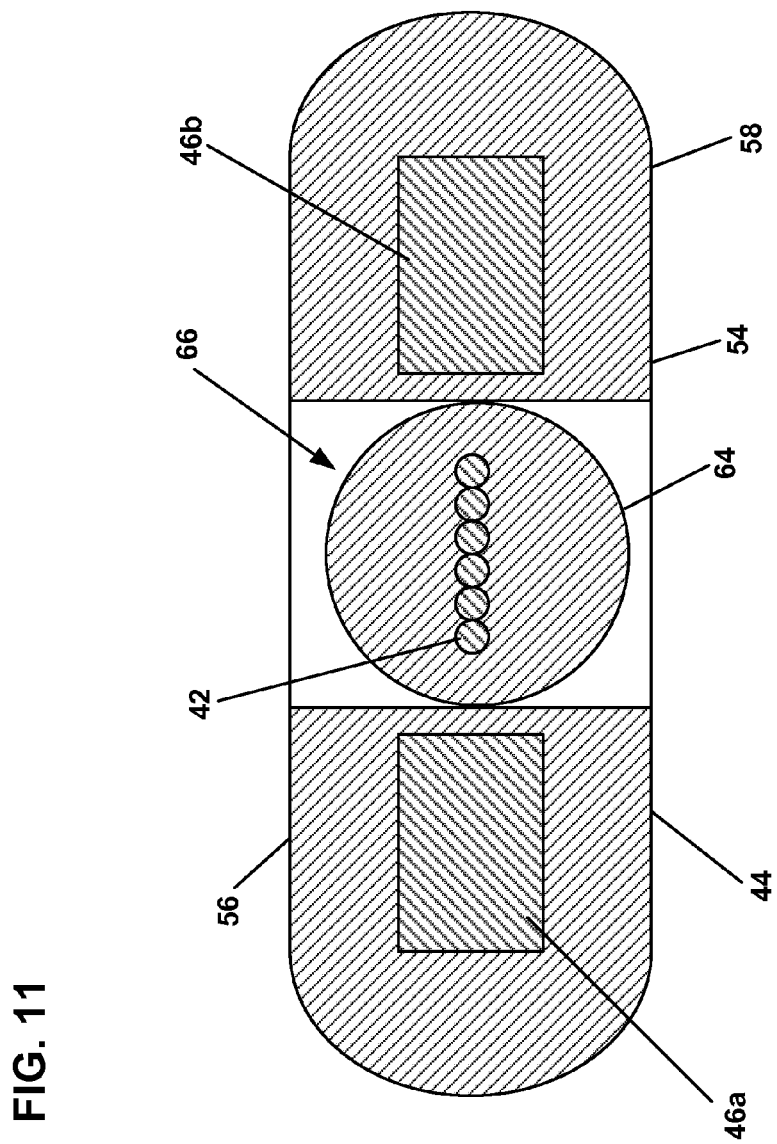
FIG. 11 is an exemplary cross-sectional view of the fiber optic cable taken on line 11-11 of FIG. 10.

Referring now to FIGS. 10, 11 and 13, the first and second portions 56, 58 of the fiber optic cable 40 are positioned so that the first portion 56 is adjacent to the second portion 58 in step 216. With the first and second portions 56, 58 adjacently disposed, the splice sleeve 64 is disposed in the window 66 and cradled between the first and second strength members 46a, 46b.

The first and second strength members 46a, 46b are secured to the first and second grooves 38a, 38b in the housing 12 of the multi-fiber connector 10 in step 218. In one embodiment, the first and second strength members 46a, 46b are secured using an adhesive material (e.g., epoxy, glue, etc.). In another embodiment, the first and second strength members 46a, 46b are mechanically secured (e.g., crimped) to the housing 12 of the multi-fiber connector 10.

Figure 12:
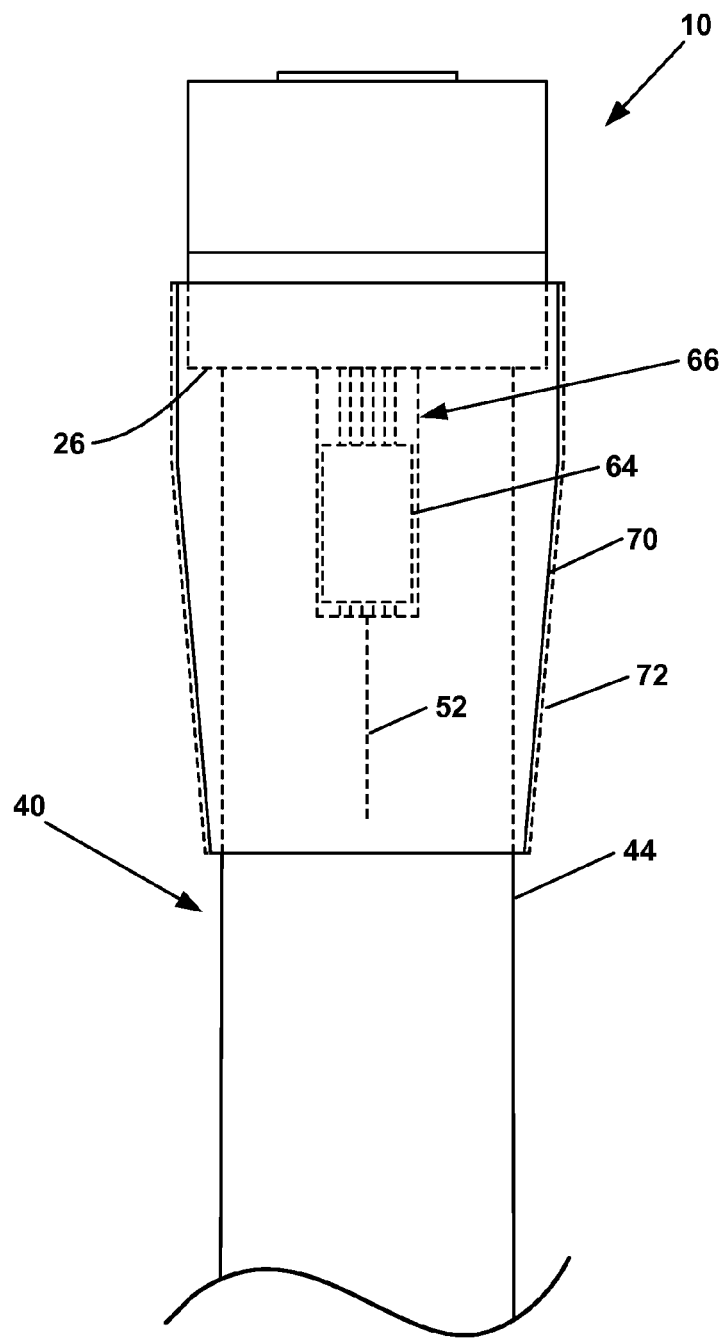
FIG. 12 is an exemplary representation of a fiber optic cable with a boot.

Referring now to FIGS. 12 and 13, a boot 70 is placed over the second end 26 of the multi-fiber connector 10 and over the slit 52 and the window 66 of the fiber optic cable 40 in step 220. With the boot 70 disposed over the slit 52 and the window 66 of the fiber optic cable 40, the splice sleeve 64 is disposed inside the boot 70.

In one embodiment, a shroud 72 may be added over the boot 70 in step 222. The shroud 72 is adapted to further protect the splices disposed in the boot 70. In one embodiment, the shroud 72 is adapted to provide water resistance. In another embodiment, the shroud 72 is adapted to provide added mechanical strength. In one embodiment, the shroud 72 is a heat shrink sleeve.

Figure 14:
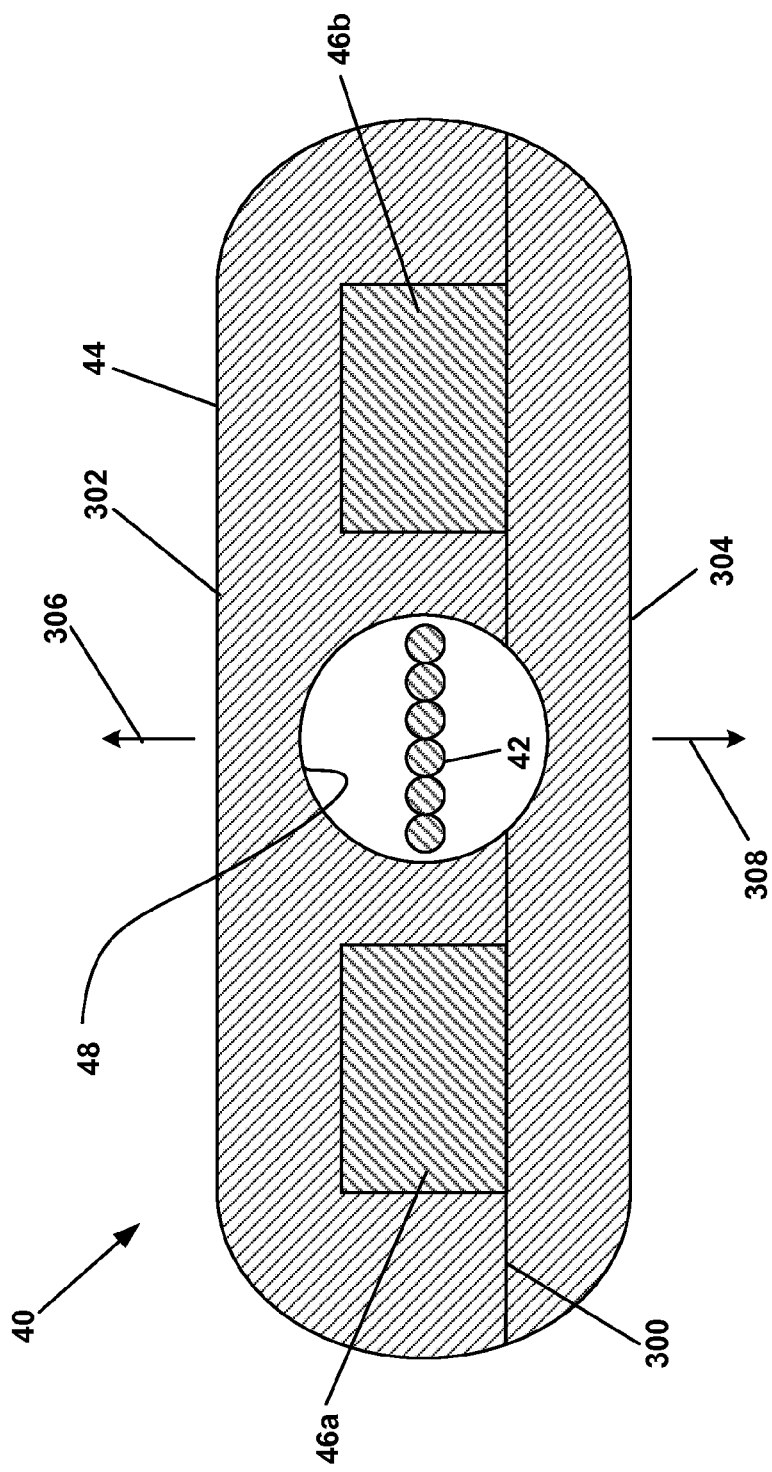
FIG. 14 is a cross-sectional view of a fiber optic cable having an alternate embodiment of a slit.
Figure 15:
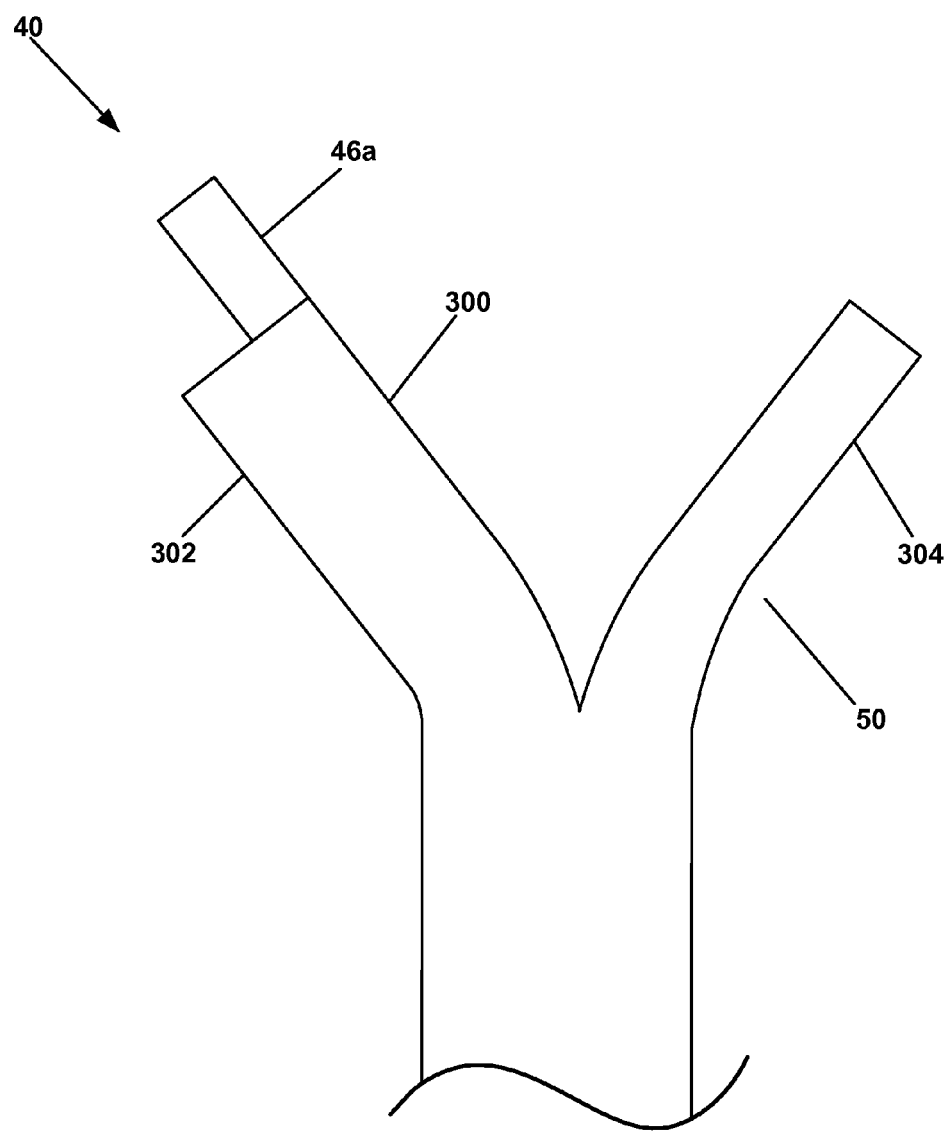
FIG. 15 is a view of a fiber optic cable having a first portion of an end of the fiber optic cable peeled away from a second portion.

Referring now to FIGS. 14 and 15, an alternate embodiment of a slit 300 made in the outer jacket 44 of the fiber optic cable 40 is shown. The slit 300 extends across a cross-sectional plane of the fiber optic cable 40 in a longitudinal direction and intersects the fiber passage 48. The slit 300 is disposed adjacent to the first and second strength members 46a, 46b. In the depicted embodiment of FIG. 14, the slit 300 is disposed on one side of the first and second strength members 46a, 46b.

The slit 300 separates the end 50 of the fiber optic cable 40 into a first portion 302 and a second portion 304. The first portion 302 includes the first and second strength members 46a, 46b. In one embodiment, the first portion 302 is peeled away from the second portion 304 by applying a force that acts in a first direction 306 to the first portion 302 and applying a second force that acts in a second direction 308 to the second portion 304. In the subject embodiment, the second direction 308 is opposite the first direction 306. With the first and second portions 302, 304 separated, the optical fibers 42 in the fiber passage 48 are accessible.

Figure 16:
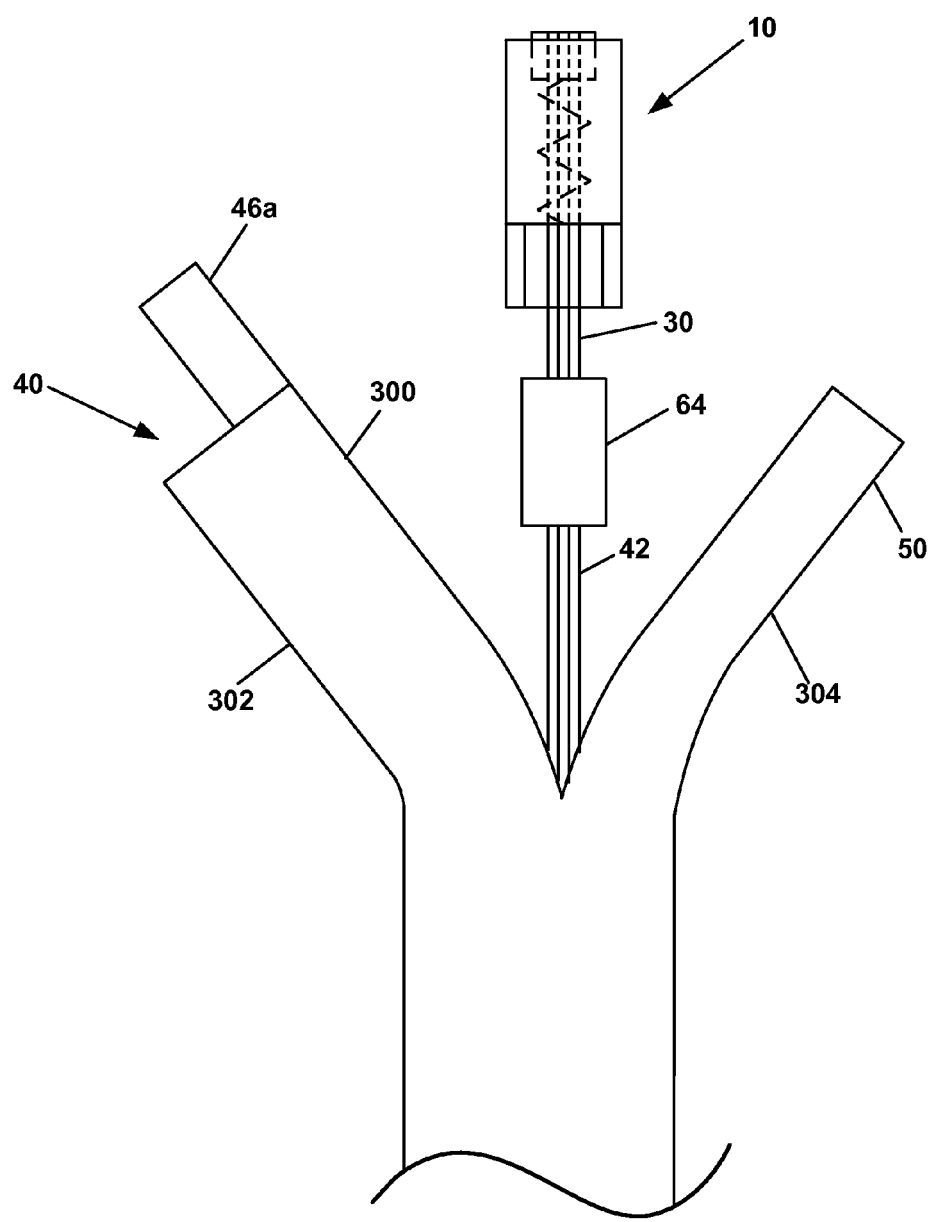
FIG. 16 is an exemplary representation of a fiber optic cable spliced to a multi-fiber connector.

Referring now to FIG. 16, the multi-fiber connector 10 is spliced to the fiber optic cable 40. In one embodiment, the optical fibers 30 of the multi-fiber connector 10 are fusion spliced to the optical fibers 42 of the fiber optic cable 40. In another embodiment, the optical fibers 30 of the multi-fiber connector 10 and the optical fibers 42 of the fiber optic cable 40 are spliced and recoated. The splice sleeve 64 is installed over the splices between the optical fibers 30 of the multi-fiber connector 10 and the optical fibers 42 of the fiber optic cable 40.

Figure 17:
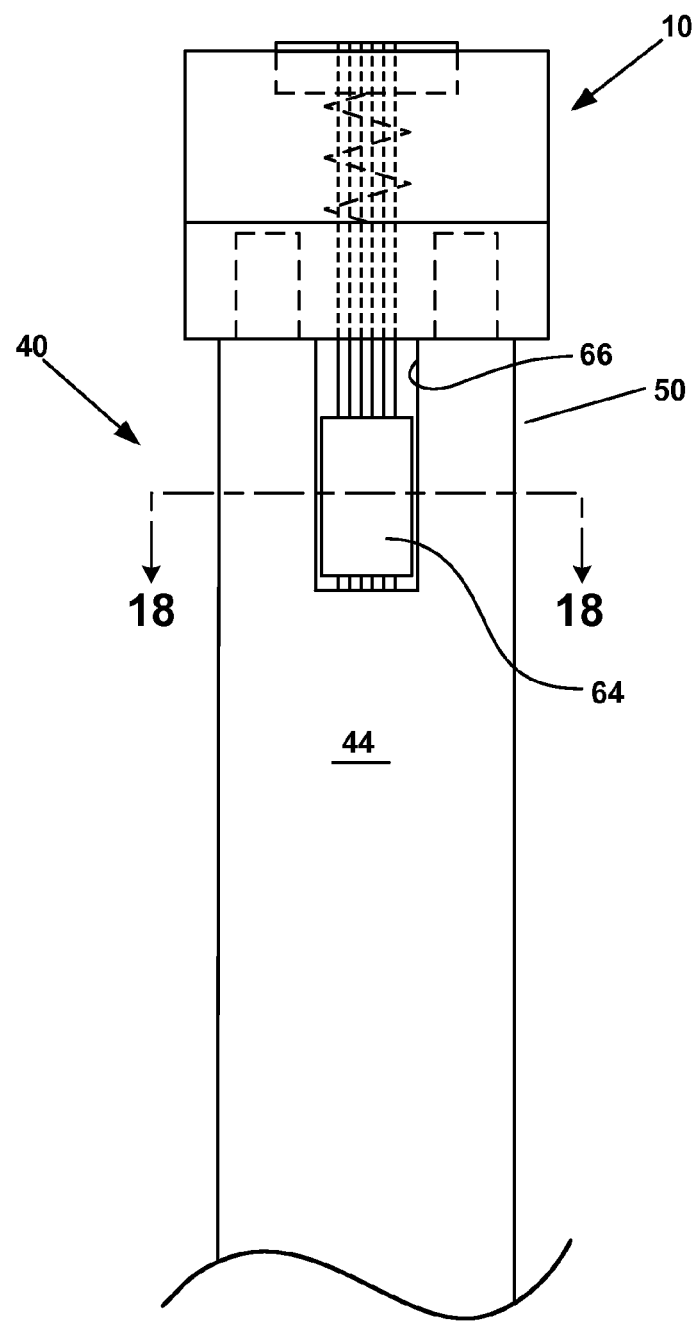
FIG. 17 is an exemplary representation of a splice sleeve disposed in a window of a fiber optic cable.
Figure 18:
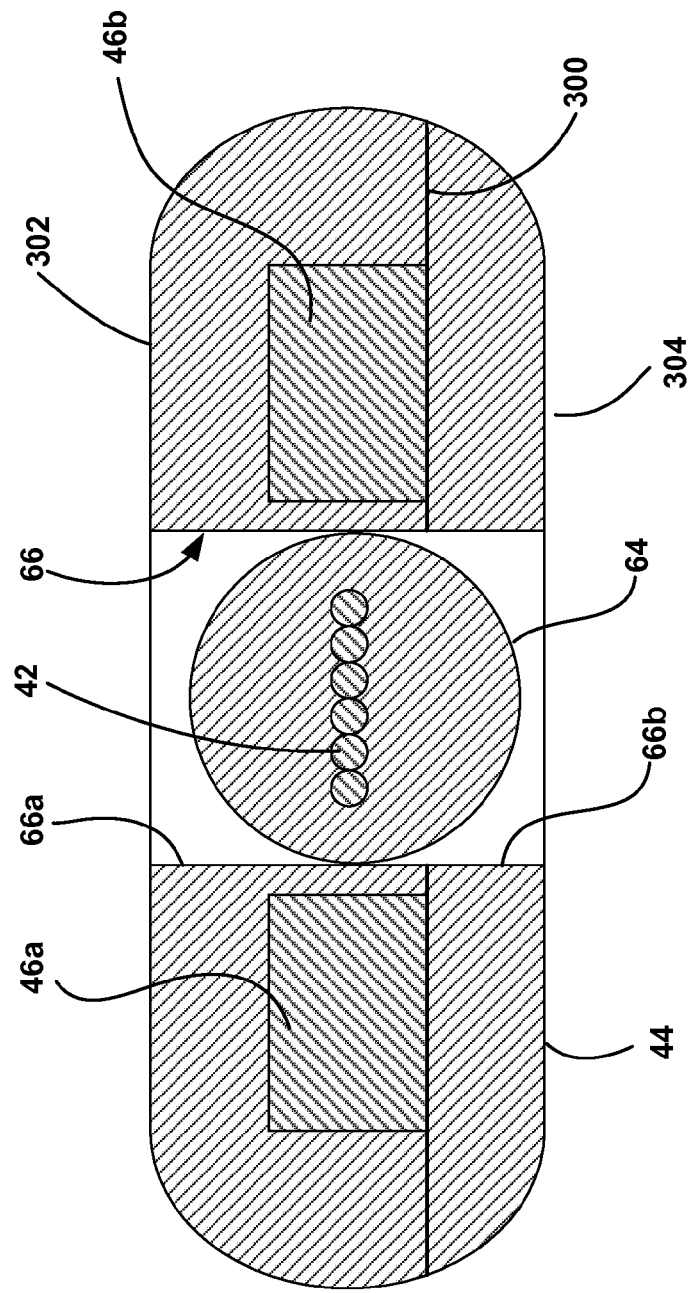
FIG. 18 is an exemplary cross-sectional view of the fiber optic cable taken on line 18-18 of FIG. 17.

Referring now to FIGS. 17 and 18, the window 66 is cut into the outer jacket 44 since the splice sleeve 64 has an outer diameter that is greater than the inner diameter of the fiber passage 48. The window 66 is a space that is disposed between the first and second strength members 46a, 46b and is adapted to receive the splice sleeve 64. In the depicted embodiment, the window 66 bifurcates the end 50 of the fiber optic cable 40.

In one embodiment, the window 66 is defined by a first recess 66a and a second recess 66b. With the first portion 302 of the fiber optic cable 40 peeled away from the second portion 304, the first recess 66a is cut into the first portion 302 of the outer jacket 44 and the second recess 66b is cut into the second portion 304 of the outer jacket 44.

The first and second portions 302, 304 of the fiber optic cable 40 are positioned so that the first portion 302 is adjacent to the second portion 304. With the first and second portions 302, 304 adjacently disposed, the splice sleeve 64 is disposed in the window 66. The first and second strength members 46a, 46b are secured to the multi-fiber connector 10.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fiber optic cable assembly comprising:
a multi-fiber connector including:
a housing having a first axial end and an oppositely disposed second axial end;
a ferrule disposed in the housing;
a plurality of optical fibers, each of the optical fibers having a first end mounted in the ferrule and an oppositely disposed second end that extends outwardly from the second axial end of the housing;
a fiber optic cable including:
an outer jacket defining a fiber passage that extends longitudinally through the outer jacket, the outer jacket further defining a window that extends through the outer jacket and the fiber passage;
a first strength member disposed in the outer jacket;
a second strength member disposed in the outer jacket, wherein the first and second strength members are oppositely disposed about the fiber passage;
a plurality of optical fibers disposed in the fiber passage, the optical fibers of the fiber optic cable being joined at a splice location to the optical fibers of the multi-fiber connector;
a splice sleeve disposed over the splice location between the optical fibers of the fiber optic cable and the optical fibers of the multi-fiber connector, the splice sleeve being disposed in the window of the outer jacket; and
a boot disposed over the second axial end of the housing and the window of the outer jacket.

2. The fiber optic cable assembly of claim 1, wherein the multi-fiber connector includes a spring that acts against the ferrule.

3. The fiber optic cable assembly of claim 1, wherein the first and second strength members are flexible.

4. The fiber optic cable assembly of claim 3, wherein each of the first and second strength members includes a layer of reinforcing elements embedded within a binder.

5. The fiber optic cable assembly of claim 1, wherein the first and second strength members are rigid.

6. The fiber optic cable assembly of claim 1, wherein an end of the fiber optic cable is bifurcated by the window.

7. The fiber optic cable assembly of claim 1, wherein the fiber optic cable includes a shroud disposed over the boot.

8. The fiber optic cable assembly of claim 7, wherein the shroud is a heat shrink sleeve.

9. The fiber optic cable assembly of claim 1, wherein the splice sleeve is disposed between the first and second strength members.

10. The fiber optic cable assembly of claim 1, wherein the optical fibers of the fiber optic cable are disposed in the fiber passage without any intermediate buffer tubes.

11. The fiber optic cable assembly of claim 1, wherein the fiber optic cable has an elongated cross-sectional profile.

12. A method for splicing optical fibers of a fiber optic cable, the method comprising:
stripping a portion of an outer jacket from an end of a fiber optic cable so that first and second strength members are exposed;
cutting a slit into the end of the fiber optic cable, the slit extending through an outer surface of the outer jacket and through a fiber passage defined by the fiber optic cable, wherein the slit forms first and second portions of the end of the fiber optic cable;
separating the first and second portions of the fiber optic cable to expose a first plurality of optical fibers disposed in the fiber passage;
joining the first plurality of optical fibers of the fiber optic cable to a second plurality of optical fibers at splices;
cutting a window in the outer jacket of the fiber optic cable, wherein the window is disposed between the first and second strength members;
positioning the first portion adjacent to the second portion so that the splices are disposed in the window; and
installing a boot over the window.

13. The method of claim 12, further comprising installing a shroud over the boot.

14. The method of claim 13, wherein the shroud is a heat shrink sleeve.

15. The method of claim 12, wherein the first plurality of optical fibers and the second plurality of optical fibers are fusion spliced.

16. The method of claim 15, wherein the splices are recoated.

17. The method of claim 15, further comprising installing a splice sleeve over the splices, wherein the splice sleeve is disposed in the window.

18. A method for terminating a fiber optic cable with a multi-fiber optic connector, the method comprising:
 stripping a portion of an outer jacket from an end of a fiber optic cable so that a first and second strength member are exposed;
 cutting a slit into the end of the fiber optic cable, the slit extending through an outer surface of the outer jacket and through a fiber passage defined by the fiber optic cable, wherein the slit forms first and second portions of the fiber optic cable;
 separating the first and second portions of the fiber optic cable to expose a first plurality of optical fibers disposed in the fiber passage;
 joining the first plurality of optical fibers of the fiber optic cable to a second plurality of optical fibers of a multi-fiber connector at splices;
 installing a splice sleeve over the splices;
 cutting a window in the outer jacket of the fiber optic cable, wherein the window is disposed between the first and second strength members;
 positioning the first portion adjacent to the second portion so that the splice sleeve is disposed in the window;
 securing the first and second strength members in a housing of the multi-fiber connector; and
 installing a boot over an axial end of the housing of the multi-fiber connector and the window of the fiber optic cable.

19. The method of claim 18, further comprising preparing a ferrule of the multi-fiber connector.

20. The method of claim 18, wherein the first plurality of optical fibers and the second plurality of optical fibers are fusion spliced.

21. A fiber optic cable assembly comprising:
 a fiber optic connector including:
  a housing having a first axial end and an oppositely disposed second axial end;
  a ferrule disposed in the housing;
  an optical fiber having a first end mounted in the ferrule and an oppositely disposed second end that extends outwardly from the second axial end of the housing;
 a fiber optic cable including:
  an outer jacket defining a fiber passage that extends longitudinally through the outer jacket, the outer jacket further defining a window that extends through the outer jacket and the fiber passage;
  a first strength member disposed in the outer jacket;
  a second strength member disposed in the outer jacket, wherein the first and second strength members are oppositely disposed about the fiber passage;
  an optical fiber disposed in the fiber passage, the optical fiber of the fiber optic cable being joined at a splice to the optical fiber of the fiber optic connector;
 a splice sleeve disposed over the splice between the optical fiber of the fiber optic cable and the optical fiber of the fiber optic connector, the splice sleeve being disposed in the window of the outer jacket; and
 a boot disposed over the second axial end of the housing and the window of the outer jacket.

\* \* \* \* \*